(12) United States Patent
Knox et al.

(10) Patent No.: US 6,175,388 B1
(45) Date of Patent: Jan. 16, 2001

(54) APPARATUS AND METHOD FOR GENERATING ON-SCREEN-DISPLAY MESSAGES USING ON-BIT PIXELS

(75) Inventors: Michael Dwayne Knox; Aaron Hal Dinwiddie, both of Fishers, IN (US)

(73) Assignee: Thomson Licensing S.A., Boulogne Cedex (FR)

( * ) Notice: Under 35 U.S.C. 154(b), the term of this patent shall be extended for 0 days.

(21) Appl. No.: 09/147,906

(22) PCT Filed: Oct. 16, 1996

(86) PCT No.: PCT/US96/16459

§ 371 Date: Mar. 23, 1999

§ 102(e) Date: Mar. 23, 1999

(87) PCT Pub. No.: WO98/17056

PCT Pub. Date: Apr. 23, 1998

(51) Int. Cl.[7] ....................................... H04N 5/445
(52) U.S. Cl. .......................... 348/569; 348/589; 348/600
(58) Field of Search ................................... 348/569, 589, 348/600; H04N 5/445

(56) References Cited

FOREIGN PATENT DOCUMENTS

| 0707426 | 4/1996 | (EP) | H04N/7/26 |
| 2292294 | 2/1996 | (GB) | G06T/1/60 |
| 94/29840 | 12/1994 | (WO) | G09G/1/14 |
| 95/35626 | 12/1995 | (WO) | H04N/5/445 |

Primary Examiner—Sherrie Hsia
(74) Attorney, Agent, or Firm—Joseph S. Tripoli; Paul P. Kiel

(57) ABSTRACT

An apparatus and concomitant method for generating an OSD message by constructing an OSD bitstream having a plurality of "one-bit" pixels. The OSD bitstream contains an OSD header and OSD data. An OSD unit retrieves pixel control information from the OSD header which is programmed by a processor of a decoding/displaying system. The OSD header contains information that is used to program a color palette of the OSD unit and to provide instructions as to the treatment of the OSD data. If the "Compressed Pixel Mode" is enabled in the OSD header, then the OSD unit will treat each bit of the OSD data as a "one-bit" pixel.

14 Claims, 3 Drawing Sheets

APPARATUS AND METHOD FOR GENERATING ON-SCREEN-DISPLAY MESSAGES USING ON-BIT PIXELS

FIELD OF THE INVENTION

The present invention relates to a method and apparatus for generating On-Screen-Display (OSD) messages. More particularly, this invention relates to a method and apparatus that reduces the memory bandwidth requirements of a decoding/displaying system by using one-bit pixels to access a palette that is pre-defined for an OSD region.

BACKGROUND OF THE INVENTION

On-Screen-Display messages play an important role in consumer electronics products by providing users with interactive information such as menus to guide them through the usage and configuration of the product. Other important features of OSD include the ability to provide Closed Captioning and the display of channel logos.

However, the heightened standard of digital video technology presents an ever increasing problem of generating and displaying OSD messages. For example, there are specific High Definition Television (HDTV) requirements that an HDTV must display up to 216 characters in four (4) "windows" versus the current National Television Systems Committee (NTSC) requirements of a maximum of 128 characters in one "window". These new requirements place severe strains on the decoding/displaying system for television signals, which must decode the incoming encoded data streams and present the decoded data to a display system with minimal delays. Since OSD messages must be displayed (overlaid) with the video data, the microprocessor of the decoding/displaying system must assign a portion of the memory bandwidth to perform OSD functions, thereby increasing the memory bandwidth requirements of a decoding/displaying system and the overall computational overhead.

Thus, a need exists for a method and apparatus for generating On-Screen-Display (OSD) messages without increasing the hardware requirements, e.g., memory bandwidth, of a decoding/displaying system.

SUMMARY OF THE INVENTION

The invention concerns an apparatus and concomitant method for generating OSD messages by constructing a valid OSD bitstream having a 40 plurality of "one-bit" pixels.

More specifically, in accordance with the invention, an OSD unit retrieves an OSD bitstream from a storage device. The OSD bitstream contains an OSD header and OSD data. The OSD header contains control information that is used to program a color palette of the OSD unit and to provide instructions as to the treatment of the OSD data. The control information is programmed by a processor of a decoding/displaying system. If the "Compressed Pixel Mode" is enabled in the OSD header, then the OSD unit will treat each bit of the OSD data in the OSD bitstream as a "one-bit" pixel. Namely, each OSD data bit represents one of two possible indices, where each index identifies one of the many possible OSD palette entries. For example, if there are 16 possible entries which are accessible by 4-bit addresses, then the "one-bit" pixel can access two of the possible entries using only a single bit.

These and other aspects of the invention will be described with respect to the accompanying drawings.

DETAILED DESCRIPTION OF THE DRAWINGS

Figure 1:
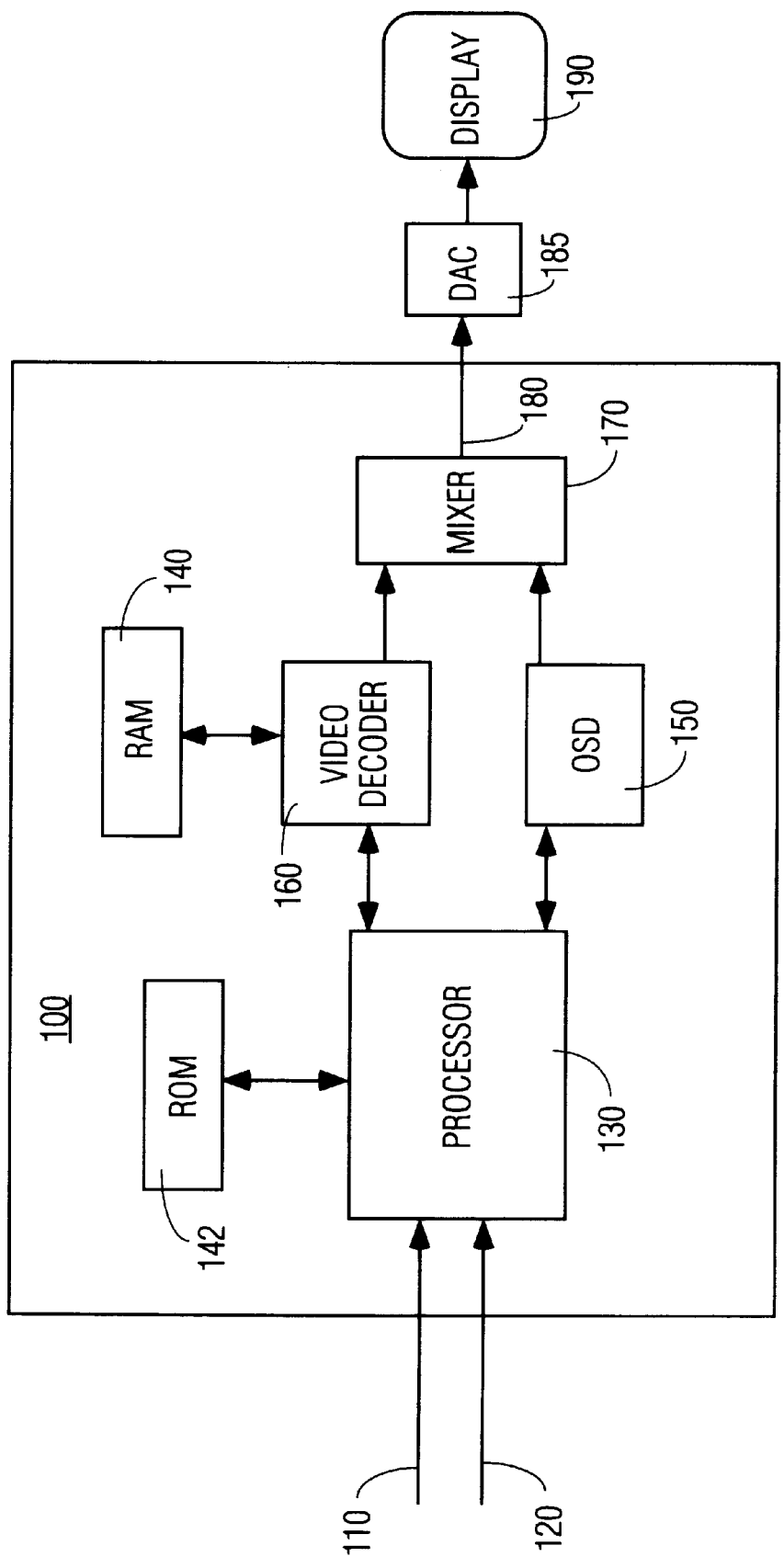
FIG. 1 is a block diagram of a decoding/displaying system including an OSD unit in accordance with an aspect of the invention.

FIG. 1 illustrates a block diagram of a decoding/displaying system for television signals 100 (hereinafter decoding system). The decoding system comprises a processor 130, a random access memory (RAM) 140, a read-only memory (ROM) 142, an OSD unit 150, a video decoder 160, and a mixer 170. The output of the mixer 170 is coupled to a display device 190 via path 180.

The present invention is described below in accordance with the MPEG standards, ISO/IEC international Standards 11172 (1991) (generally referred to as MPEG-1 format) and 13818 (1995) (generally referred to as MPEG-2 format). However, those skilled in the art will realize that the present invention can be applied or adapted to other decoding systems implementing other encoding/decoding formats.

In the preferred embodiment, the decoding system 100 performs real time audio and video decompression of various data streams (bitstreams) 120. The bitstreams 120 may comprise audio and video elementary streams that are encoded in compliance with the MPEG-1 and MPEG-2 standards. The encoded bitstreams 120 are generated by an encoder (not shown) and are transmitted to the decoding system through a communication channel. The encoded bitstreams contain a coded representation of a plurality of images and may include the audio information associated with those images, e.g., a multimedia data stream. The multimedia source may be a HDTV station, a video disk, a cable television station and the like. In turn, the decoding system 100 decodes the encoded bitstreams to produce a plurality of decoded images for presentation on the display 190 in synchronization with the associated audio information. However, for the purpose of this invention, the audio decoding function of the decoding system 100 is not discussed.

More specifically, processor 130 receives bitstreams 120 and bitstreams 110 as inputs. Bitstreams 110 may comprise various control signals or other data streams that are not included in the bitstreams 120. For example, a channel decoder or transport unit (not shown) can be deployed between the transmission channel and the decoding system 100 to effect the parsing and routing of data packets into data streams or control streams.

In the preferred embodiment, processor 130 performs various control functions, including but not limited to, providing control data to the video decoder 160 and OSD unit 150, managing access to the memory and controlling the display of the decoded images. Although the present invention describes a single processor, those skilled in the art will realize that the processor 130 may comprise various dedicated devices to manage specific functions, e.g., a memory controller, a microprocessor interface unit and the like.

Processor 130 receives bitstreams 120 and writes the data packets into the memory 140 via video decoder 160. The bitstreams may optionally pass through a First-In-First-Out (FIFO) buffer (not shown) before being transferred via a memory data bus to the memory. Furthermore, there is generally another memory (not shown) which is used solely by the processor 130.

The memory 140 is used to store a plurality of data including compressed data, decoded images and the OSD bit map. As such, the memory is generally mapped into various buffers, e.g., a bit buffer for storing compressed data, an OSD buffer for storing the OSD bit map, various frame buffers for storing frames of images and a display buffer for storing decoded images.

In accordance with the MPEG standards, the video decoder 160 decodes the compressed data in the memory 140 to reconstruct the encoded images in the memory. In some cases, the decoded image is a difference signal that is added to a stored reference image to produce the actual image, e.g., to facilitate decoding a motion compensated image. Once an image is reconstructed, it is stored in the display buffer pending display via the mixer 170.

Similarly, the OSD unit 150 uses the memory 140 to store the OSD bit map or the OSD specification. The OSD unit allows a user (manufacturer) to define a bit map for each field which can be superimposed on the decoded image. The OSD bit map may contain information concerning the configuration and options of a particular consumer electronics product. Alternatively, the OSD bit map may contain information relating to Closed Captioning and channel logos that are transmitted from a cable television, a video disk and the like. An OSD bit map is defined as a set of regions (generally in rectangular shapes) of programmable position and size, each of which has a unique palette of available colors.

The OSD bit map is written into the OSD buffer of the memory 140 which is assigned for this purpose by the user. However, those skilled in the art will realize that a ROM 142 or other equivalent storage devices can also serve this function as well.

When the OSD function is enabled for a particular image or frame, the processor 130 manipulates the data in memory 140 to construct an OSD bitstream. The OSD bitstream contains an OSD header and OSD data (pixel data).

More specifically, the processor 130 programs (formats and stores) the OSD header in the memory 140. The OSD header contains information concerning the locations of the top and bottom OSD field bit maps, palette data, pointer to the next header block and various display modes involving OSD resolution, color and compression. Once the OSD header is programmed, the processor 130 may manipulate the OSD data in the memory 140 in accordance with a particular implementation. For example, the OSD data is formatted in accordance with a selected mode, e.g., the Compressed Pixel Mode as discussed below. Alternatively, the processor may simply program the OSD header with pointers to the OSD data in the memory, where the stored OSD data is retrieved without modification to form the OSD bitstream.

The processor 130 then reports the enable status, e.g., OSD active, to the OSD unit 150, which responds by requesting the processor 130 for access to the OSD bitstream stored within the memory 140. The OSD bitstream is formed and retrieved as the OSD unit reads the OSD headers, each followed by its associated OSD data. After receiving the OSD bitstream, the OSD unit processes the OSD pixel data in accordance with the instructions or selected modes in the OSD header. The OSD unit then waits for a pair of display counters (not shown) to attain count values that identifies the correct position on the display for inserting the OSD information. At the correct position, the OSD unit forwards its output to the mixer 170. The output of the OSD unit 150 is a stream or sequence of digital words representing respective luminance and chrominance components. New memory accesses are requested as required to maintain the necessary data flow (OSD bitstream) through the OSD unit to produce a comprehensive OSD display. When the last byte of the OSD pixel data for the current OSD region is read from the memory, the next OSD header is read and the process is repeated up through and including the last OSD region for the current frame.

Those skilled in the art will realize that the order of constructing and retrieving the OSD bitstream as discussed above can be modified. For example, the OSD header can be read from the memory as the processor is formatting the OSD data, or the OSD data can be processed and displayed as OSD messages by the OSD unit without having to retrieve the entire OSD bitstream.

Since OSD pixel data is superimposed on the decoded image, the mixer 170 serves to selectively blend or multiplex the decoded image with the OSD pixel data. Namely, the mixer 170 has the capability to display at each pixel location, an OSD pixel, a pixel of the decoded image or a combination (blended) of both types of pixels. This capability permits the display of Closed Captioning (OSD pixel data only) or the display of transparent channel logos (a combination of both OSD pixels and decoded image pixels) on a decoded image.

Video decoder 160 and OSD unit 150 both form streams or sequences of digital words representing respective luminance and chrominance components. These sequences of video component representative digital words are coupled via mixer 170 to a digital-to-analog converter (DAC) 185. The luminance and chrominance representative digital words are converted to analog luminance and chrominance signals by the respective sections of the DAC.

The OSD unit 150 can be used to display a user defined bit map over any part of the displayable screen, independent of the size and location of the active video area. This bit map can be defined independently for each field and specified as a collection of OSD regions. A region is often a rectangular area specified by its boundary and by a bit map defining its contents. Each region has associated with it a palette defining a plurality of colors (e.g., 4 or 16 colors) which can be used within that region. If required, one of these colors can be transparent, allowing the background to show through as discussed above.

However, handling the OSD functions for a frame increases the computational overhead of the processor 130 and, more importantly, places severe strains on the memory bandwidth of the processor because the processor 130 must service memory requests from both the video decoder 160 and the OSD unit 150. As such, the present invention reduces the size of the OSD bitstream by implementing the Compressed Pixel Mode.

Figure 2:
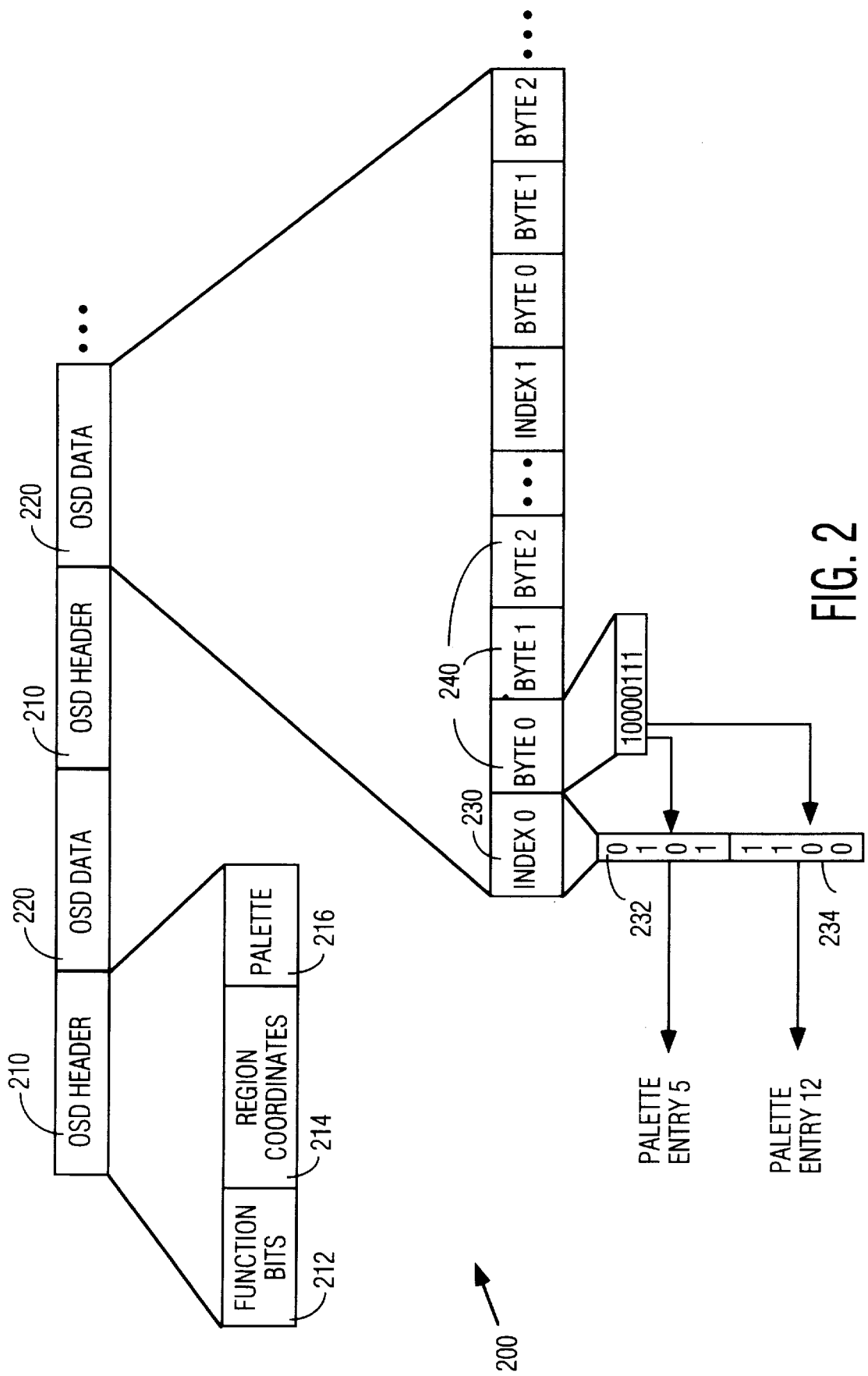
FIG. 2 is a block diagram which discloses the structure of a sample compressed pixel bitstream.

FIG. 2 illustrates the structure of a sample "compressed pixel" OSD bitstream 200. The OSD bitstream comprises a plurality of OSD headers 210, each followed by OSD data 220. In one embodiment, the header is comprised of five 64-bit words, followed by any number of 64-bit OSD data (bit map) words. The OSD header 210 contains information relating to the OSD region coordinates 214, the various entries of the palette 216 for a particular OSD region, and various function codes (bits) 212. Those skilled in the art will realize that the OSD header can be of any length. A longer header can provide more information and options, e.g., a palette with more entries, but at the expense of incurring a higher computational overhead, i.e., more read and write cycles. In fact, the content of the OSD header is illustrative of a particular embodiment and is not limited to the specific arrangement as illustrated in FIG. 2.

The OSD region coordinates 214 contain the positions of the left and right edge of an OSD region, i.e., row start and stop positions and column start and stop positions. For interlaced display, the region coordinates include the positions (pointers) of the top and bottom field pixel bit maps for the corresponding OSD region. Finally, the OSD region coordinates 214 include a pointer to the next header block in the memory.

The palette 216 contains a plurality of entries where each entry contains a representation of chrominance and luminance levels for an OSD pixel. The palette information 216 is used to program the OSD palette. Since each OSD header contains palette information 216, the available colors can be selectively changed for each OSD header and its associated OSD data bytes. In the preferred embodiment, each palette entry contains 16 bits of data, i.e., six (6) bits of luminance, Y, four (4) bits of blue chrominance, $C_b$, and four (4) bits of red chrominance, $C_r$. The remaining two bits are used to implement various display options that are irrelevant to the present invention. In one embodiment, there are 16 entries in the palette requiring 4 bits to address each entry.

The function codes (bits) 212 contain information relating to various modes, including but not limited to, display options and OSD bitstream options. In the preferred embodiment, the function bits contain a single bit to indicate whether the "Compressed Pixel Mode" is enabled. When the "Compressed Pixel Mode" is enabled, the data in the OSD data contains a plurality or "runs" of "one-bit" pixels as discussed below.

The OSD data 220 contains the bit map in left to right and top to bottom order. The OSD data is used to define the color index of each pixel. In the preferred embodiment, if "Compressed Pixel Mode" is enabled, then the OSD data 220 contains an index byte 230 which is followed by a plurality of data bytes 240. The length of the index byte 230 and data bytes 240 are set at 8 bits for each byte. The index 230 contains the addresses for two (2) particular palette entries having a 4-bit address. As such, by setting each data bit in the OSD data 220 to a high or low value, one of the two available index addresses can be accessed easily using a single bit or a "one-bit" pixel.

Furthermore, the Compressed Pixel Mode allows a user to specify a "run" of one-bit pixels. A run length counter informs the OSD unit as to how many one-bit pixels there are in each run. The run length count is written in the OSD header.

To illustrate, FIG. 2 shows an index byte 230 having a first index 232 and a second index 234, where the indices represent the palette entries 5 and 12 respectively. If the most significant bit (msb) of each OSD pixel byte corresponds to the first pixel out, then if a bit is "1", the most significant four bits 232 of the index byte are sent to address the palette. If a bit is "0", then the least significant four bits 234 of the index byte are sent to address the palette. Furthermore, if the compressed run length count equal twenty, then the next three data bytes 240 following the index byte contain those twenty "one-bit" pixels. At the end of each run, the following byte must be the next index byte, followed by the next run.

This mode of operation allows the processor 130 to gain a 4:1 compression ratio over the normal display mode that uses four bits to address the palette. The saving is more significant for decoding systems that incorporate larger palettes. In this Compressed Pixel Mode, only two colors can be selected at a time for a given run. However, since application like Closed Captioning only employs two colors for a given character, the Compressed Pixel Mode decreases the number of memory operations without limiting the display capabilities of a particular OSD implementation. Additionally, the processor can easily change the two color selections by simply changing the color index 230 at the end of a run, thereby permitting color changes. Finally, although the Compressed Pixel Mode is selected for an OSD header 210, the OSD unit supports multiple header blocks which can each have a different resolution mode. Thus, the OSD unit is able to display different types of resolution or formats on the same video screen.

The selection of the Compressed Pixel Mode is controlled by the user via the processor 130. This control can be implemented using software that detects the need to minimize memory access by the OSD unit 150. For example, the video decoder 160 may receive a series of complicated encoded frames that require additional memory access. To minimize memory access conflicts between the OSD unit and the video decoder, the processor can offset the increased demand of the video decoder by enabling the Compressed Pixel Mode in the OSD bitstream.

Figure 3:
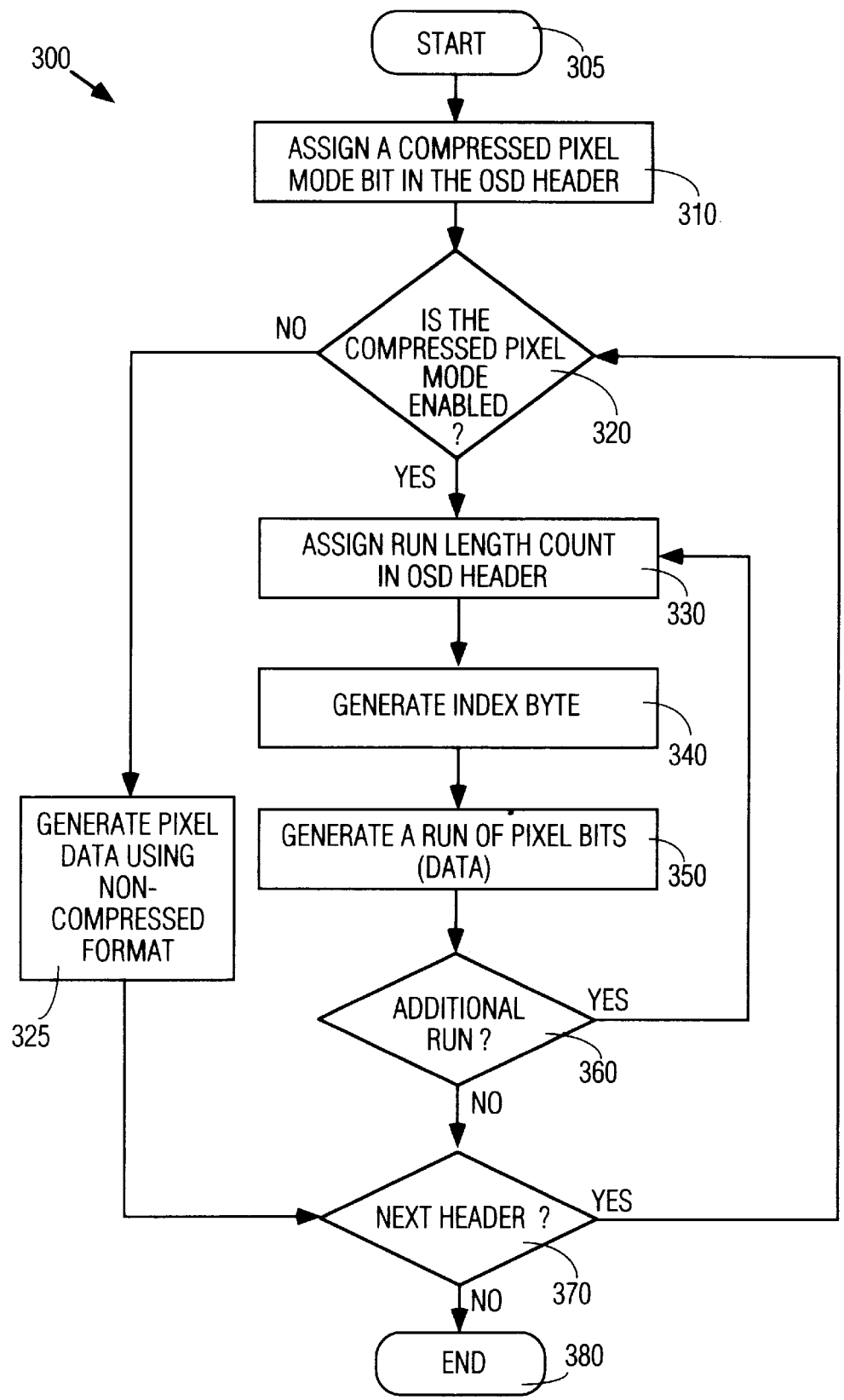
FIG. 3 is a flowchart illustrating the method for constructing a valid OSD bitstream having a plurality of one-bit pixels.

FIG. 3 illustrates a method 300 for constructing an OSD bitstream having a plurality of one-bit pixels. The OSD bitstream is generated by the processor 130 and is processed by the OSD unit 150. Method 300 constructs an OSD bitstream of FIG. 2 by generating an OSD header having a compressed pixel mode bit, followed by a plurality of index and data bytes.

Referring to FIG. 3, the method 300 begins at step 305 and proceeds to step 310 where a bit in the OSD header is designated as a compressed pixel mode bit. If the compressed pixel mode is enabled in the OSD header, then the OSD data bits following the header are one-bit pixels. If the compressed pixel mode is not enabled, then the OSD data bits are treated in accordance with a normal format, which may be a 4-bit address to a palette (or any other bitstream formats, e.g., the MPEG standards).

In step 320, method 300 determines whether the compressed pixel mode is enabled. If the query is negatively answered, method 300 proceeds to step 325 where the OSD data bytes are generated using a non-compressed format. Method 300 then proceeds to step 370.

If the query at step 320 is affirmatively answered, method 300 proceeds to step 330 where a "run length count" is written to the OSD header. The "run length count" represents a run of one-bit pixels in the OSD data bytes and is used to initialize a run length counter.

In step 340, method 300 generates an index byte having two indices that identify two possible entries in a palette located in the OSD header. The two indices are selected for the entire run.

In step 350, method 300 generates a run of one-bit pixels disposed within the OSD data bytes. Although each OSD data byte has a length of 8-bits, the run length is not restricted to any length, i.e., a run of twenty one-bit pixels can be disposed within three OSD data bytes.

In step 360, method 300 determines whether there are any additional runs. A new run may be required if the selected two colors are modified. If the query is negatively answered, method 300 proceeds to step 370. If the query is affirmatively answered, method 300 proceeds to step 330 where the steps of 330–350 are repeated for each additional run. The indices within the index byte can be selectively modified for each run.

In step 370, method 300 determines whether there is another OSD header. A new OSD header may be required if the selected colors in the palette and the various modes represented by the function bits 212 are modified. Similarly, a new header is required for each new OSD region on a frame. If the query is negatively answered, method 300 proceeds to step 380 where method 300 ends. If the query is affirmatively answered, method 300 proceeds to step 320 where the steps of 320–360 are repeated for each additional OSD header. In this manner, the OSD bitstream may comprise both compressed OSD data bytes and non-compressed OSD data bytes.

There has thus been shown and described a novel method and apparatus for constructing an OSD bitstream having a plurality of one-bit pixels that provides improved memory bandwidth utilization within a decoding/displaying system. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method of constructing an on-screen display (OSD) bitstream, said method comprising the steps of:

setting a bit in an OSD header to indicate one of a compressed pixel mode and a non-compressed pixel mode;

generating an index byte containing addresses when the bit in the OSD header indicates the compressed pixel mode; and generating a plurality of one-bit pixels, each pixel indicating one of said addresses.

2. The method of claim 1, further comprising the step of:

assigning a run length for said plurality of one-bit pixels.

3. The method of claim 1, wherein said index byte generating step comprises the steps of:

generating a first index; and generating a second index.

4. The method of claim 3, wherein said first and second indices correlate to two palette entries.

5. The method of claim 4, wherein each of said plurality of one-bit pixels correlates to one of said indices.

6. The method of claim 1, wherein said plurality of one-bit pixels contain a plurality of non-compressed pixels when said bit in said OSD header indicates the non-compressed pixel mode.

7. An OSD bitstream stored in a storage medium comprising:

a header having a bit for indicating one of a compressed pixel mode and a non-compressed pixel mode; and OSD data, coupled to said header, including an index byte containing addresses and a plurality of one-bit pixels, each pixel indicating one of said addresses when the bit in the OSD header indicates the compressed pixel mode.

8. The OSD bitstream of claim 7, wherein said plurality of OSD data bits include indices to a palette.

9. The OSD bitstream of claim 7, wherein said OSD bitstream is generated in accordance with MPEG standards.

10. The OSD bitstream of claim 7, wherein said plurality of OSD data bits include non-compressed pixels when said bit in said OSD header indicates the non-compressed pixel mode.

11. Apparatus for generating an OSD bitstream comprising:

a storage medium for storing an OSD header and OSD data; and a processor, coupled to said storage medium for enabling a compressed pixel mode bit within said OSD header and for reading said OSD header and said OSD data including an index byte containing addresses and a plurality of one-bit pixels, each pixel selecting one of said addresses.

12. The apparatus of claim 11, wherein said storage medium is a read only memory (ROM).

13. The apparatus of claim 11, wherein said storage medium is a random access memory (RAM).

14. Apparatus for generating an OSD message comprising:

a storage medium for storing an OSD bit stream having a header including a bit for indicating one of a compressed pixel mode and a non-compressed pixel mode and OSD data, coupled to said header, including an index byte containing addresses and a plurality of one-bit pixels, each pixel indicating one of said addresses when the bit in the OSD header indicates the compressed pixel mode.

a processor, coupled to said storage medium, for programming a compressed pixel mode bit within said header to indicate said compressed pixel mode and for formatting said OSD data using said plurality of one-bit pixels; and an OSD unit, coupled to said processor, for processing said OSD bitstream to form the OSD message.

* * * * *